United States Patent
Weng

(10) Patent No.: US 10,242,148 B2
(45) Date of Patent: Mar. 26, 2019

(54) INTEGRATED CIRCUIT AND ROUTING DESIGN OF THE SAME

(71) Applicant: MediaTek Inc., Hsin-Chu (TW)

(72) Inventor: Lichiu Weng, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 45 days.

(21) Appl. No.: 14/824,576

(22) Filed: Aug. 12, 2015

(65) Prior Publication Data

US 2016/0055290 A1     Feb. 25, 2016

Related U.S. Application Data

(60) Provisional application No. 62/041,177, filed on Aug. 25, 2014.

(51) Int. Cl.
| | |
|---|---|
| *H01L 27/02* | (2006.01) |
| *H01L 29/06* | (2006.01) |
| *H01L 29/10* | (2006.01) |
| *H01L 29/78* | (2006.01) |
| *H01L 27/088* | (2006.01) |
| *G06F 17/50* | (2006.01) |

(52) U.S. Cl.
CPC ...... *G06F 17/5081* (2013.01); *G06F 17/5077* (2013.01); *H01L 27/0207* (2013.01); *H01L 27/0886* (2013.01); *H01L 29/0649* (2013.01); *H01L 29/1037* (2013.01); *H01L 29/7851* (2013.01); *G06F 2217/06* (2013.01)

(58) Field of Classification Search
CPC ............. H01L 27/0207; H01L 27/0886; H01L 27/1104; H01L 27/1116; H01L 29/7851; H01L 29/0649; H01L 29/1037; H01L 29/41758; H01L 29/1095; H01L 27/3255; G06F 17/5068–17/5081

See application file for complete search history.

(56) References Cited

U.S. PATENT DOCUMENTS

| | | | |
|---|---|---|---|
| 8,737,107 B2 | 5/2014 | Liaw | |
| 8,762,911 B1 | 6/2014 | Lu | |
| 8,766,364 B2 | 7/2014 | Doornbos et al. | |
| 2003/0173649 A1* | 9/2003 | Miller | B81B 7/0006 257/620 |
| 2011/0133285 A1* | 6/2011 | Liaw | H01L 27/0207 257/368 |
| 2011/0222332 A1* | 9/2011 | Liaw | G11C 11/412 365/156 |
| 2012/0278781 A1 | 11/2012 | Wann et al. | |

(Continued)

FOREIGN PATENT DOCUMENTS

| | | |
|---|---|---|
| CN | 101783169 A | 7/2010 |
| CN | 103681652 A | 3/2014 |

*Primary Examiner* — Stephen M Bradley
(74) *Attorney, Agent, or Firm* — McClure, Qualey & Rodack, LLP

(57) ABSTRACT

The invention provides an integrated circuit. The integrated circuit includes a substrate having a first cell region and a second cell region. A first electronic device is disposed on the substrate in the first cell region. A second electronic device is disposed on the substrate in the second cell region. A first bottommost metal pattern overlaps the first cell region and the second cell region. The first bottommost metal pattern is coupled to the first electronic device and the second electronic device.

16 Claims, 8 Drawing Sheets

(56) References Cited

U.S. PATENT DOCUMENTS

| | | | |
|---|---|---|---|
| 2015/0076596 A1* | 3/2015 | Colinge | H01L 29/66356 257/335 |
| 2016/0027499 A1* | 1/2016 | Liaw | G11C 11/412 365/154 |
| 2016/0181255 A1* | 6/2016 | Nii | H01L 27/1104 257/369 |

* cited by examiner

INTEGRATED CIRCUIT AND ROUTING DESIGN OF THE SAME

CROSS REFERENCE TO RELATED APPLICATIONS

This application claims the benefit of U.S. Provisional Application No. 62/041,177 filed Aug. 25, 2014, the entirety of which is incorporated by reference herein.

BACKGROUND OF THE INVENTION

Field of the Invention

The present invention relates to an integrated circuit, and in particular to a bottommost layered-level metal routing design for an integrated circuit.

Description of the Related Art

For an integrated circuit design, a shrinkage channel length for an electronic device and an increased amount of input/output connections (pin account) for multi-functional cells are required. Accordingly, the fin-like electronic devices for the increase pin accesses for the cells have been developed. For a conventional integrated circuit, however, the density of routings for input/output connections of fin-like electronic devices is limited due to design-rule restrictions for the bottommost layered-level metal (also referred to as first-level metal (M1)) routings.

Thus, a novel integrated circuit and a routing design of the integrated circuit are needed.

BRIEF SUMMARY OF THE INVENTION

An integrated circuit is provided. An exemplary embodiment of an integrated circuit includes a substrate having a first cell region and a second cell region. A first electronic device is disposed on the substrate in the first cell region. A second electronic device is disposed on the substrate in the second cell region. A first bottommost metal pattern overlaps the first cell region and the second cell region. The first bottommost metal pattern is coupled to the first electronic device and the second electronic device.

Another exemplary embodiment of an integrated circuit includes a substrate having a first cell region and a second cell region. A first fin field-effect transistor is extended from the substrate in the first cell region. A second fin field-effect transistor is extended from the substrate in the second cell region. A first bottommost metal pattern overlaps a portion of a first boundary of the first cell region overlapping a second boundary of the second cell region.

A computer-implemented method for designing an integrated circuit is provided. The method includes using a computer to perform the steps of providing a first physical layout corresponding to a plurality of first bottommost metal leads configured to couple to a first electronic device, a second electronic device and a third electronic device. A second bottommost metal lead is inserted into the first physical layout to connect any adjacent two of the first bottommost metal leads to obtain a second physical layout. A constraint comprising geometric shapes corresponding to the second physical layout is provided. Overlapping portions between the geometric shapes and the second physical layout are calculated by the computer. The overlapping portions are removed to obtain a third physical layout. The third physical layout is verified.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
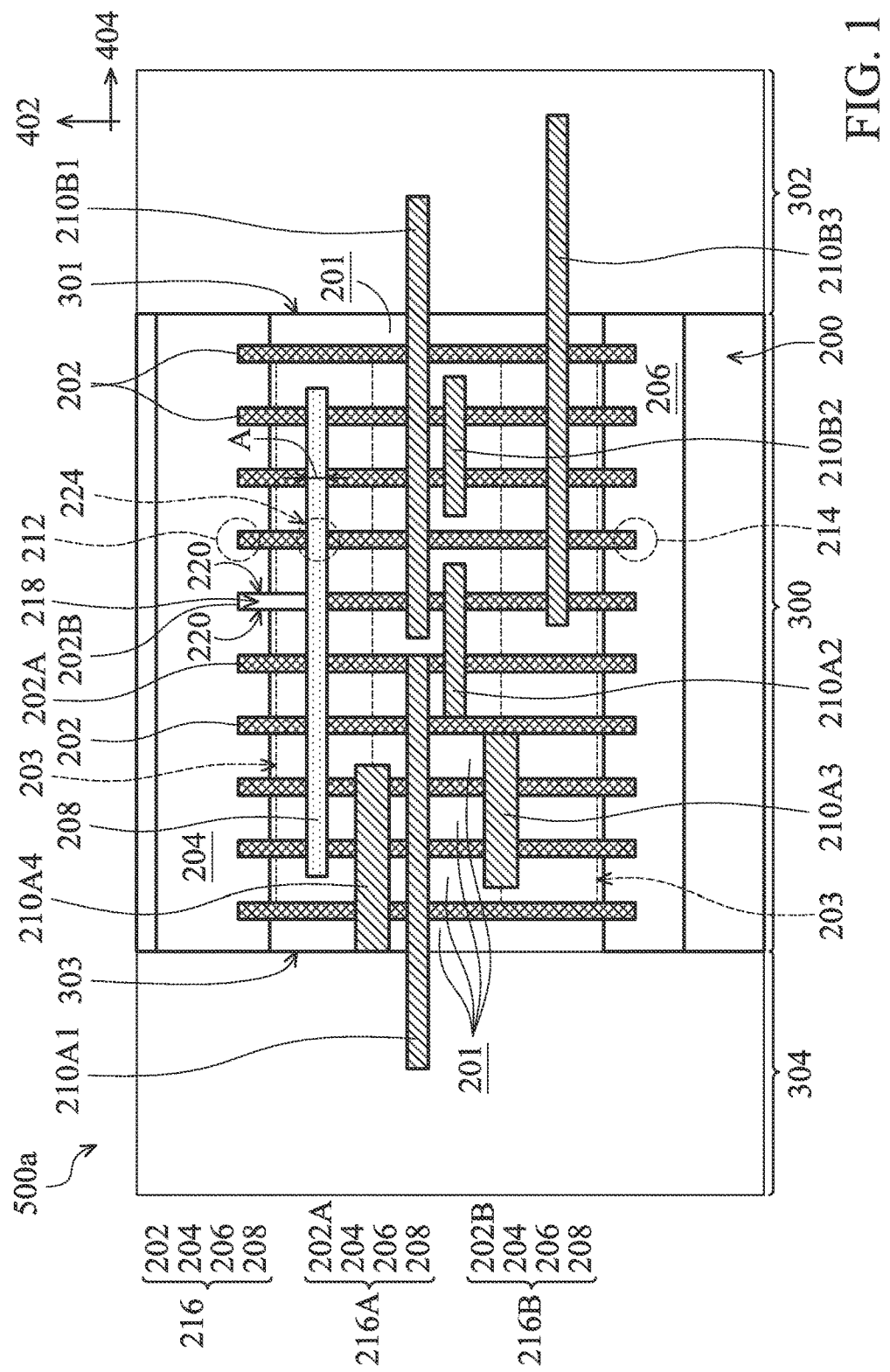
FIGS. 1-3 are a top view of an integrated circuit in accordance with some embodiments of the disclosure.

The following description is of the best-contemplated mode of carrying out the invention. This description is made for the purpose of illustrating the general principles of the invention and should not be taken in a limiting sense. The scope of the invention is determined by reference to the appended claims.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

Embodiments provide an integrated circuit. The integrated circuit includes fin-liked electronic devices disposed in several cell regions on a substrate. The integrated circuit uses bottommost metal patterns not only for the routings of the devices within a single cell region, but also for the routing between devices in different cell regions.

Figure 2:
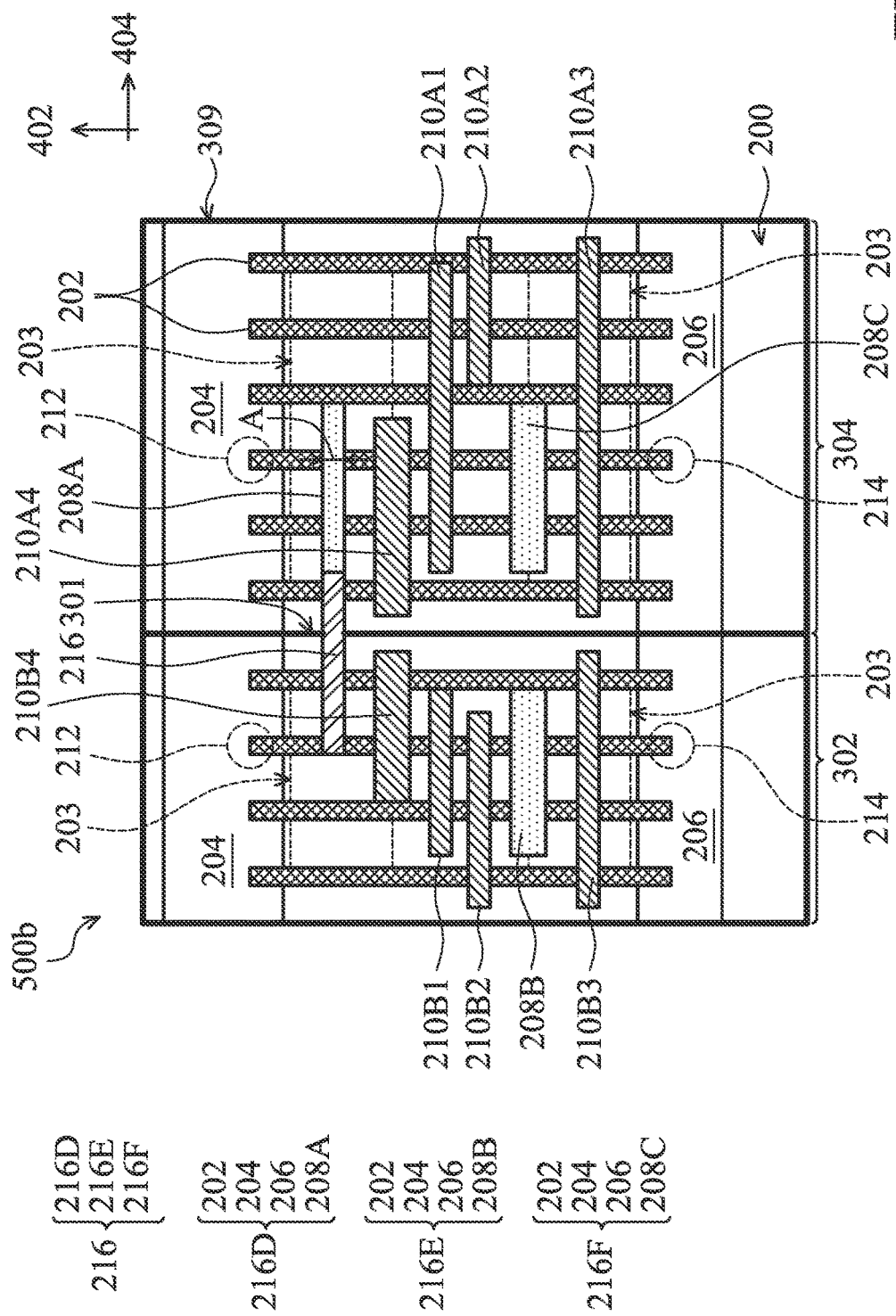
Figure 3:
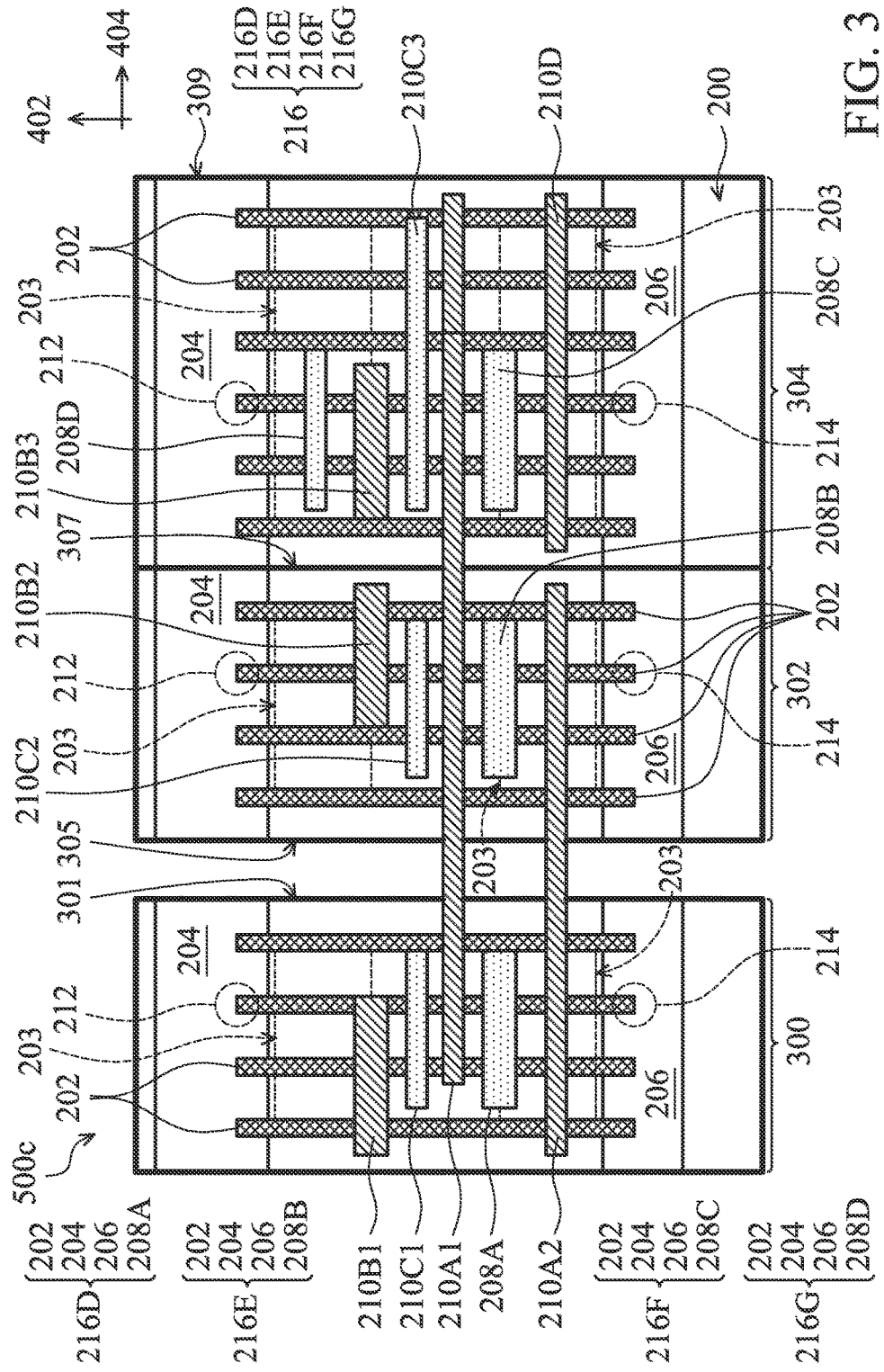

FIGS. 1-3 are a top view of an integrated circuit 500a-500c in accordance with some embodiments of the disclosure. In some embodiments, the integrated circuit comprises fin field-effect transistors (fin FETs) disposed therein. As shown in FIG. 1, the integrated circuit 500a comprises a substrate 200. In some embodiments, the substrate 200 may comprise a semiconductor wafer. In some other embodiments, the substrate 200 may comprise a carrier. The substrate 200 comprises several cell regions, for example, cell regions 300, 302 and 304 arranged substantially along a direction 404. The cell regions 300, 302 and 304 may have a side-by-side arrangement. In some embodiments, the cell regions 300, 302 and 304 are different cell regions on the semiconductor wafer. In some other embodiments, the cell regions 300, 302 and 304 may comprise individual dies disposed on the carrier.

In the cell region 300 shown in FIG. 1, the integrated circuit 500a comprises a plurality of electronic devices 216 disposed on the substrate 200 in the cell region 300. In some embodiments, each of the electronic devices 216, for example, a fin FET, may comprise a fin 202 having source/drain regions 212 and 214, and a gate structure 208. As shown in FIG. 1, the fins 202 comprising fin 202A and 202B extend from the substrate 200. In some embodiments, each of the fins 202 is defined by trench isolation features 201 extending substantially along a direction 402. Therefore, the fins 202 are extended substantially along the direction 402. In some embodiments, the trench isolation features 201 may comprise shallow trench isolation (STI) features. It should be noted that the direction 402 is not parallel to the direction 404. For example, the direction 402 is substantially perpendicular to the direction 404. Source/drain regions 204 and 206 are formed in the substrate 200 within the first cell region 300 by a doping process. The source/drain regions 204 and 206 may be arranged close to terminals of the fins 202. Therefore, a terminal region of the fin 202 overlapping the source/drain region 204 may serve as a source/drain region 212 of the electronic device 216. Similarly, a terminal region of the fin 202 overlapping the source/drain region 206 may serve as a source/drain region 214 of the fin 202. Therefore, regions between the source/drain regions 204 and 206 may serve as active regions 203 of the substrate 200. A gate structure 208 is formed on tops 218 and opposite sidewalls 220 of some of the fin 202. Also, the gate structure 208 is formed extending substantially along the direction 404. In some embodiments, a region of the fin 202 overlapping the gate structure 208 is defined as a channel region 224 of the electronic device 216. The channel region 224 is positioned in the middle region of the fin 202 and between the source/drain regions 212 and 214. The channel region 224 has a length A along the direction 402. The length A is defined as a channel length of the electronic devices 216. In some embodiments, the channel length of the electronic devices 216 is designed to be equal to or less than 20 nm, for example, 20 nm, 16 nm, 14 nm or 10 nm.

As shown in FIG. 1, the integrated circuit 500a further comprises a plurality of bottommost metal patterns 210A1-210A4, 210B1-210B3 disposed in the cell region 300. The bottommost metal patterns 210A1-210A4, 210B1-210B3 substantially parallel to each other and in contact with terminals of the electronic devices 216 (such as source, drain or gate terminals of the electronic devices 216) are serve as input/output (I/O) pins (or lead) for the electronic devices 216. In some embodiments, the bottommost metal patterns 210A1-210A4 and 210B1-210B3 are disposed at a bottommost metal layered-level of an interconnection structure for the electronic devices 216. The bottommost metal patterns 210A1-210A4, 210B1-210B3 may also serve as first-level metal (M1) patterns for the electronic devices 216. In some embodiments, other bottommost metal patterns can be formed disposed on the source/drain regions 204 and 206. The bottommost metal patterns overlapping and contact to the source/drain regions 204 and 206 may serve as routings for the source/drain regions 204 and 206 of the electronic devices 216.

In some embodiments, the bottommost metal patterns 210A1-210A4 and 210B1-210B3 are formed extending substantially along the direction 404. It should be noted that some of the bottommost metal patterns 210A1-210A4 and 210B1-210B3 in the cell region 300 may be formed extending outside the cell region 300 to the adjacent cell region 302 or 304. The bottommost metal patterns 210A1-210A4 and 210B1-210B3 overlaps a boundary 301 between the cell region 300 and the adjacent cell region 302 or a boundary 303 between the cell region 300 and the adjacent cell region 304. The bottommost metal patterns 210A1, 210B1 and 210B3 overlapping the cell region 300 and the adjacent cell region 302 or 304 are used to increase the routing resource for the integrated circuit 500a. For example, the bottommost metal pattern 210A1 coupled to some of the electronic devices 216, comprising the electronic device 216A, extended substantially along the direction 404 to the adjacent cell region 304 may serve as an additional routing for electronic devices in the cell regions 300 and 304. The bottommost metal patterns 210B1 and 210B3 coupled to some other of the electronic devices 216, comprising the electronic device 216B, extended substantially along the direction 404 to the adjacent cell region 302 may serve as an additional routing for electronic devices in the cell regions 300 and 302.

As shown in FIG. 1, the bottommost metal patterns 210A3, 210A4, 210B1 and 210B2 are formed within the cell region 300. In some embodiments, the bottommost metal patterns 210A3, 210A4, 210B1 and 210B2 serve as input/output (I/O) pins (or lead) for the electronic devices 216 within the cell region 300.

FIG. 2 is a top view of an integrated circuit 500b in accordance with some embodiments of the disclosure. Elements of the embodiments hereinafter, that are the same or similar as those previously described with reference to FIG. 1, are not repeated for brevity. One of the differences between the integrated circuits 500a and 500b is that the integrated circuit 500b has a bottommost metal pattern extended from the cell region 300 to an area of the adjacent cell region 302. One of the electronic devices 216 may be coupled to a second-level metal (M2) pattern within the adjacent cell region 302 through the bottommost metal pattern to increase routing flexibility and routing resource.

As shown in FIG. 2, the substrate 200 of the integrated circuit 500b comprises two adjacent cell regions 304 and 302. Gate structures 208A and 208C extending substantially along the direction 404 are formed within the cell region 304. A gate structure 208B is formed within the cell region 302 substantially along the direction 404. The integrated circuit 500b further comprises bottommost metal patterns 210A1-210A4 disposed in the cell region 304 and bottommost metal patterns 210B1-210B4 disposed in the cell region 302. In some embodiments, the bottommost metal patterns 210A1-210A4 serve as input/output (I/O) pins (or referred to as leads) for the electronic devices 216D and 216F within the cell region 304. The bottommost metal patterns 210B1-210B4 serve as input/output (I/O) pins (or lead) for the electronic device 216E within the cell region 302. As shown in FIG. 2, the opposite edges of the bottommost metal pattern 210A3/210A4, which are oriented along the direction 404 can be aligned to the opposite edges of the bottommost metal pattern 210B3/210B4, respectively. It should be noted that the parallel bottommost metal patterns 210A1-210A4 and 210B1-210B4 are positioned in a way that is dependent upon the pin assignments for the electronic devices 216 in the cell regions 302 and 304, and are not meant to be limiting.

In some embodiments, a bottommost metal pattern 216 is formed extending outside the cell region 304 to the adjacent cell region 302 and overlapping a boundary 301 between the cell region 304 and the adjacent cell region 302. That is to say, the bottommost metal pattern 216 crosses the cell regions 304 and 302. The bottommost metal pattern 216 connects the gate structure 208A of the electronic devices 216 in the cell region 300 and a second layered-level metal (M2) pattern (not shown) positioned within the adjacent cell region 302. The area of the cell region 302 where the bottommost metal pattern 216 extended thereto may have a lower routing density than other areas in the cell region 302. Also, the bottommost metal pattern 216 may be extended to a dummy area for the bottommost metal layer in the cell region 302. Therefore, the bottommost metal dummy patterns are not positioned overlapping the bottommost metal pattern 216 to conform to design-rule.

FIG. 3 is a top view of an integrated circuit 500c in accordance with some embodiments of the disclosure. Elements of the embodiments hereinafter that are the same or similar as those previously described with reference to FIGS. 1-2 are not repeated for brevity. The integrated circuit 500c has a bottommost metal pattern extended from the cell region 304 to the adjacent cell region 302. The integrated circuit 500c also has a bottommost metal pattern extended from the cell region 302 to the cell region 300 close to the cell region 302. Alternatively, the integrated circuit 500c has a bottommost metal pattern extended from the cell region 304 to the cell region 300, which is positioned close to the cell region 302 and away from the cell region 304. The extended bottommost metal pattern can directly connect the pin assignment positions of the different electronic devices in adjacent cell regions in the same track along the direction 404.

As shown in FIG. 3, the substrate 200 of the integrated circuit 500c comprises the cell region 300, and two adjacent cell regions 302 and 304. The cell region 302 is close to the cell region 304 and separated from the cell region 300 by a distance. Gate structures 208A, 208B and 208C in the same track along the direction 404 are formed within the cell regions 300, 302 and 304, respectively. A gate structure 208D parallel to the gate structures 208A-208C is disposed in the cell region 304. The integrated circuit 500c further comprises bottommost metal patterns 210A1 and 210A2 disposed in the cell region 300. Bottommost metal patterns 210B1, 210B2 and 210B3 are disposed within boundaries of the cell regions 300, 302 and 304, respectively. Bottommost metal patterns 210C1, 210C2 and 210C3 are disposed within boundaries of the cell regions 300, 302 and 304, respectively. Also, a bottommost metal pattern 210D is disposed within the boundary of the cell region 304. In some embodiments, the bottommost metal patterns 210A1, 210A2, 210B1 and 210C1 serve as input/output (I/O) pins (or lead) for the electronic device 216D within the cell region 300. The bottommost metal patterns 210A1, 210A2, 210B2 and 210C2 serve as input/output (I/O) pins (or lead) for the electronic device 216E within the cell region 302. The bottommost metal patterns 210A2, 210B3, 210C3 and 210D serve as input/output (I/O) pins (or lead) for the electronic device 216F within the cell region 304.

It should be noted that the bottommost metal pattern 210A1 is extended and overlapping the cell regions 300, 302 and 304 as shown in FIG. 3. The bottommost metal pattern 210A1 can directly connect the pin assignment positions of the electronic devices (such as electronic devices 216D, 216E and 216F) in the cell regions 300, 302 and 304 in the same track along the direction 404. Also, the bottommost metal pattern 210A2 can directly connect the pin assignment positions of the electronic devices (such as the electronic devices 216D and 216E) in the cell regions 300 and 302 in the same track along the direction 404. It should be noted that the parallel bottommost metal patterns 210A1-210A2, 210B1-210B3, 210C1-210C3 and 210D are positioned dependent upon the pin assignments for the electronic devices 216 in the cell regions 302 and 304, and are not limited.

Figure 4:
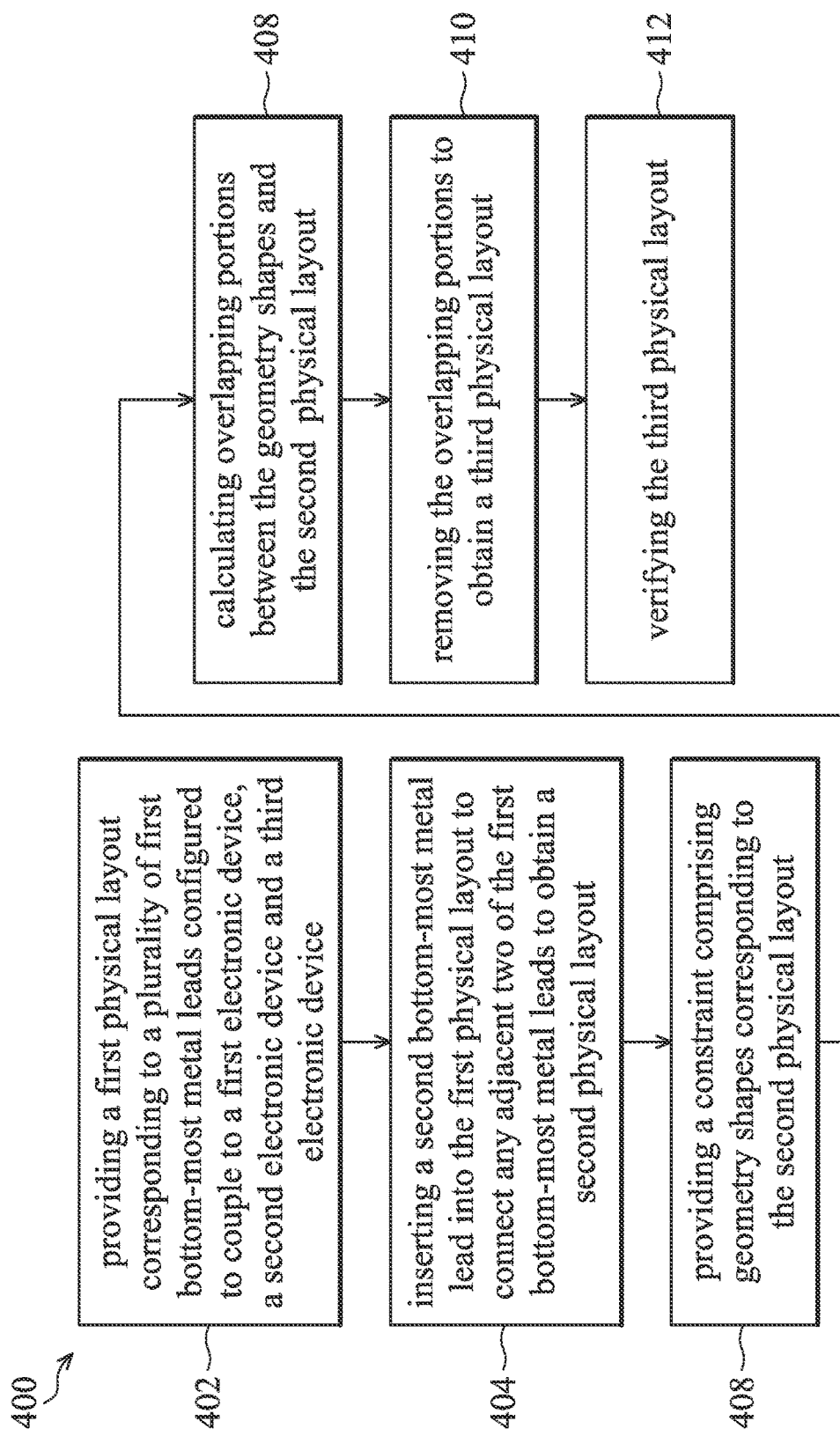
FIG. 4 is a diagram illustrating a method of designing an arrangement of bottommost metal patterns of an integrated circuit in accordance with some embodiments of FIGS. 1-3.
Figure 5A:
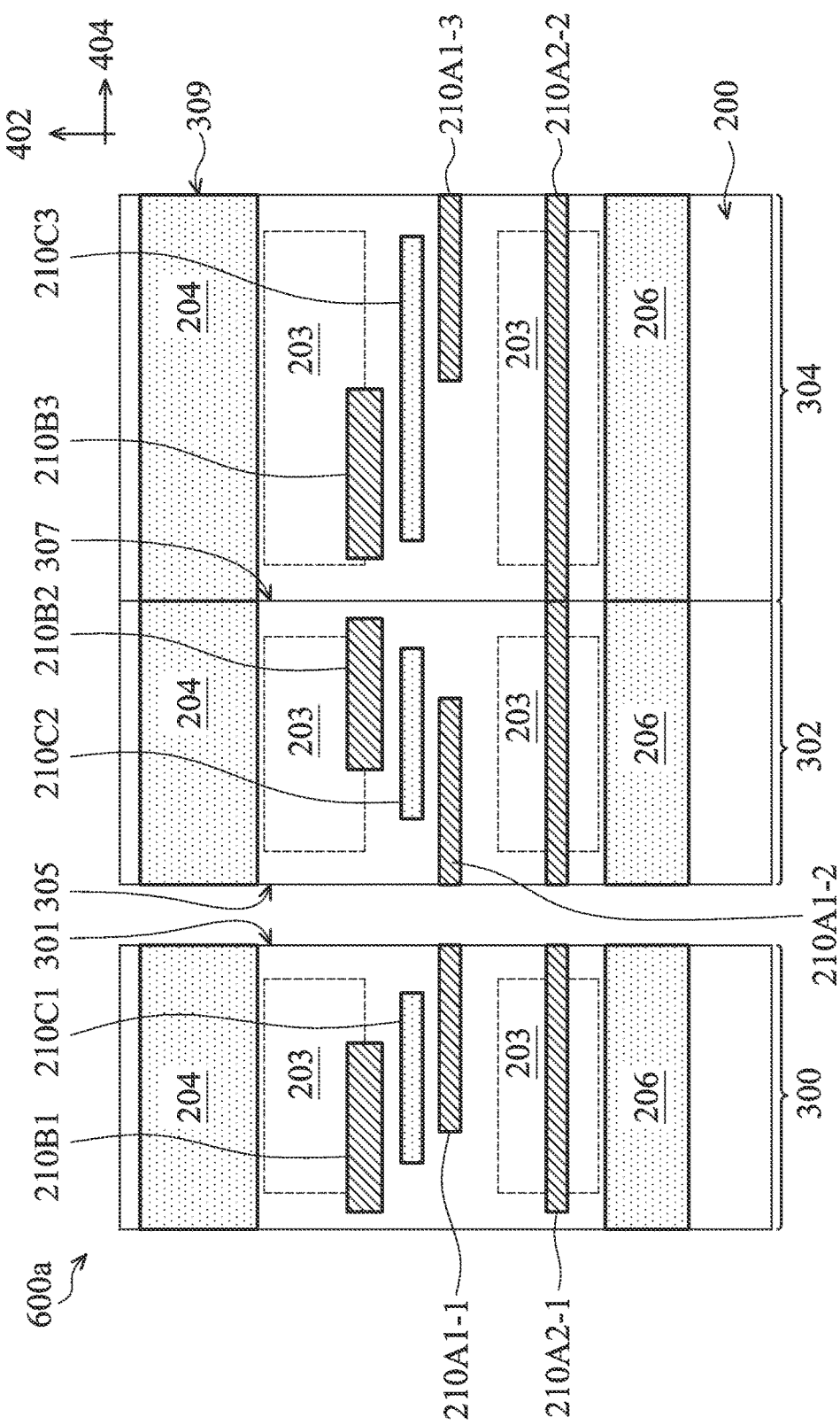
FIGS. 5A-5D are diagrams illustrating the steps of the method as shown in FIG. 4.
Figure 5B:
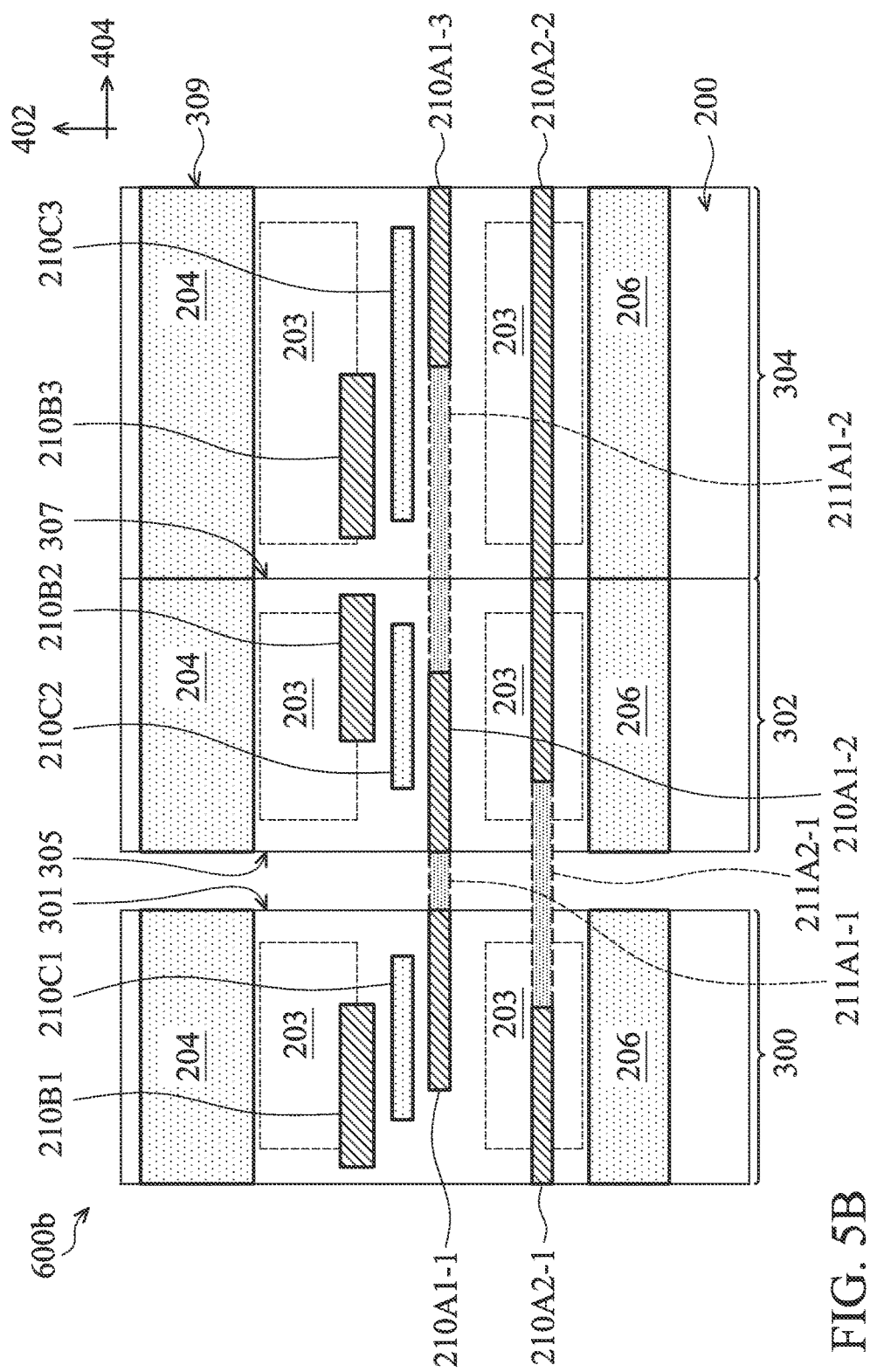
Figure 5C:
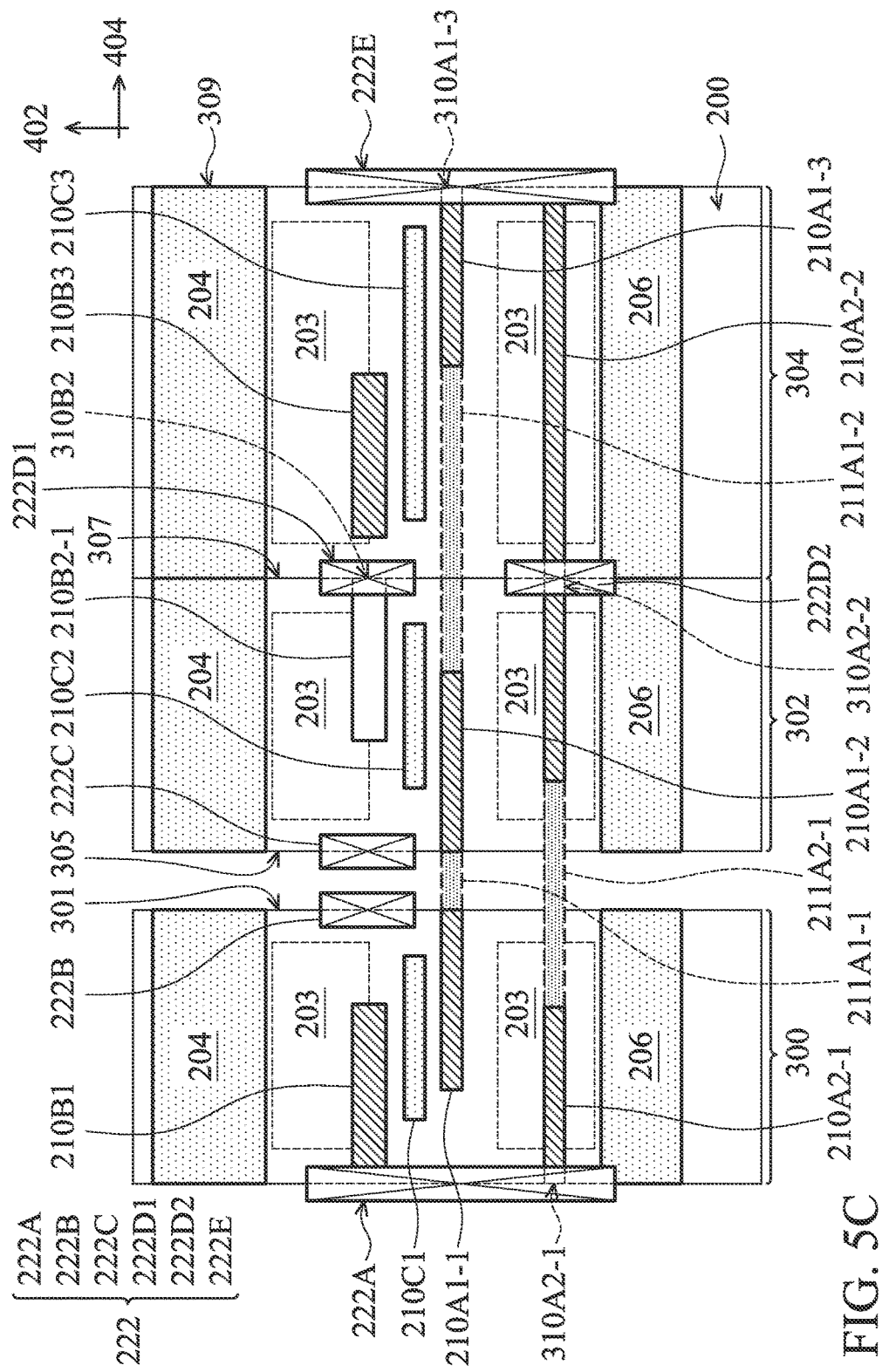

FIG. 4 is a diagram illustrating a method 400 of designing an arrangement of bottommost metal patterns of an integrated circuit in accordance with some embodiments of FIGS. 1-3. In some embodiments, the integrated circuit may comprise integrated circuit 500a, 500b or 500c as shown in FIGS. 1-3. The method 400 is implemented and performed using a computer and illustrated as a physical layout on a display. FIGS. 5A-5D are diagrams illustrating the steps of the method 400 as shown in FIG. 4. In some embodiments, the steps of the method 400 as shown in FIGS. 5A-5C utilizes the physical layout corresponding to the bottommost metal patterns 210A1-210A2, 210B1-210B3, 210C1-210C3 and 210D of the integrated circuit 500c as shown in FIG. 3. It should be noted that the method 400 can also be implemented to design the physical layout corresponding to the bottommost metal patterns of the integrated circuit 500a or 500b, and is not limited. Also, the physical layout corresponding to the cell regions 300, 302, 304 and the active regions 203 of the substrate 200 as shown in FIGS. 5A-5C are used for clarity in illustrating the relationship between positions of the bottommost metal patterns and the cell regions. Additionally, the physical layout corresponding to the cell regions and the active regions of the substrate, and the bottommost metal patterns of the integrated circuit, are labeled in the same manner as the elements shown in FIG. 3.

As shown in FIGS. 4 and 5A, the method 400 begins at step S402 where a first physical layout 600a corresponding to a plurality of first bottommost metal leads (patterns) 210A1-1, 210A1-2, 210A1-3, 210A2-1, 210A2-2, 210B1-210B3 and 210C1-210C3 is provided. In some embodiments, the first bottommost metal leads (patterns) 210A1-1, 210A1-2, 210A1-3, 210A2-1, 210A2-2, 210B1-210B3 and 210C1-210C3 parallel to each other are configured to couple to electronic devices 216 in cell regions 300, 302 and 304 as shown in FIG. 3. The first bottommost metal leads (patterns) 210A1-1, 210A2-1, 210B1 and 210C1 are arranged within the cell region 300. The first bottommost metal leads (patterns) 210A1-2, 210A2-2, 210B2-1 and 210C2 are arranged within the cell region 302. The first bottommost metal leads (patterns) 210A1-3, 210A2-2, 210B3 and 210C3 are arranged within the cell region 304. Additionally, the first bottommost metal lead 210A2-2 crosses the cell regions 302 and 304, overlapping the boundary 307, which is shared by the cell regions 302 and 304, a boundary 305 of the cell region 302 and a boundary 309 of the cell region 304. Also, the first bottommost metal leads 210A1-1, 210A2-1 and 210C1 overlap a boundary 301 of the cell region 300. The first bottommost metal leads 210A1-2 and 210B2-1 overlap the boundary 305 of the cell region 302 and the boundary 307, which is shared by the cell regions 302 and 304, respectively. The first bottommost metal lead 210A1-3 overlaps the boundary 309 of the cell region 304.

In some embodiments, the first physical layout 600a may comprise other bottommost metal leads (patterns) corresponding to the source/drain regions 204 and 206. It should be noted that the first bottommost metal leads of the first physical layout 600a are extended substantially along the direction 404. Also, the first bottommost metal leads of the first physical layout 600a are verified by performing a design rule check (DRC). That is to say, the first physical layout 600a is a DRC-free physical layout.

As shown in FIGS. 4 and 5B, the method 400 then proceeds to step S404 where a second bottommost metal leads (patterns) 211A1-1, 211A1-2 and 211A2-1 are inserted into the first physical layout 600a as shown in FIG. 5A to connect any adjacent two of the first bottommost metal leads to obtain a second physical layout 600b. As shown in FIG. 5B, the second bottommost metal lead 211A1-1 is inserted to connect the first bottommost metal lead 210A1-1 in the cell region 300 and the first bottommost metal lead 210A1-2 in the cell region 302. The second bottommost metal lead 211A1-2 is inserted to connect the first bottommost metal lead 210A1-2 in the cell region 302 and the first bottommost metal lead 210A1-3 in the cell region 304. The second bottommost metal lead 211A2-1 is inserted to connect the first bottommost metal lead 210A2-1 in the cell region 300 with the first bottommost metal lead 210A2-2 in the cell regions 302 and 304. In some embodiments, the second bottommost metal leads (patterns) 211A1-1, 211A1-2 and 211A2-1 are extended substantially along the direction 404. That is to say, the second bottommost metal leads 211A1-1, 211A1-2 and 211A2-1 are parallel to the first bottommost metal leads 210A1-1, 210A1-2, 210A1-3, 210A2-1, 210A2-2, 210B1-210B3 and 210C1-210C3.

As shown in FIGS. 4 and 5C, the method 400 then proceeds to step S406 where a constraint 222 comprising geometric shapes 222A-222C, 222D1, 222D2 and 222E corresponding to the second physical layout 600b as shown in FIG. 5B is provided. The geometric shapes 222A-222C, 222D1, 222D2 and 222E are extended along the direction 404, and the first bottommost metal leads 210A1-1, 210A1-2, 210A1-3, 210A2-1, 210A2-2, 210B1-210B3 and 210C1-210C3 are extended along the direction 402, which is different from the direction 404. In some embodiments, the constraint 220 is defined corresponding to the first bottommost metal leads (patterns) 210A1-1, 210A1-2, 210A1-3, 210A2-1, 210A2-2, 210B1-210B3 and 210C1-210C3 and the second bottommost metal leads (patterns) 211A1-1, 211A1-2 and 211A2-1 of the second physical layout 600b as shown in FIG. 5B. The constraint 222 is provided to prevent the first bottommost metal leads from overlapping the boundaries of the cell regions 300, 302 and 304. It should be noted that the constraint 222 is free from overlapping the second bottommost metal leads (patterns) 211A1-1, 211A1-2 and 211A2-1. For example, the geometry shape 222A is provided to prevent the first bottommost metal leads 210A2-1 and 210B1 from overlapping the boundary 301 of the cell region 300. The geometry shape 222F is provided to prevent the first bottommost metal leads 210A1-3 and 210A2-3 from overlapping the boundary 309 of the cell region 304. The geometric shapes 222B and 222C, however, originally positioned to prevent any bottommost metal leads from overlapping the boundary 305 of the cell region 302, have been modified so that they are free from overlapping the second bottommost metal leads (patterns) 211A1-1 and 211A2-1. Additionally, the geometric shapes 222D 1 and 222D2, however, originally connected to each other to prevent any bottommost metal leads from overlapping the boundary 307, which shared by the cell regions 302 and 304, have been modified so that they are free from overlapping the second bottommost metal lead 211A1-2. Therefore, the geometric shapes 222D1 and 222D2 are provided to prevent the first bottommost metal leads 210A2-2 and 210B2-1 from overlapping the with the boundary 307 shared by the cell regions 302 and 304.

As shown in FIGS. 4 and 5C, the method 400 then proceeds to step S408 where overlapping portions between the geometric shapes and the second physical layout are calculated by a computer. As shown in FIG. 5C, the overlapping portion 310A2-1 between the geometry shape 222A and the first bottommost metal lead 210A2-1, the overlapping portion 310B2 between the geometry shape 222D1 and the first bottommost metal lead 210B2-1, the overlapping portion 310A2-2 between the geometry shape 222D2 and the first bottommost metal lead 210A2-2, and the overlapping portion 310A1-3 between the geometry shape 222E and the first bottommost metal lead 210A1-3 are calculated by a computer.

Figure 5D:
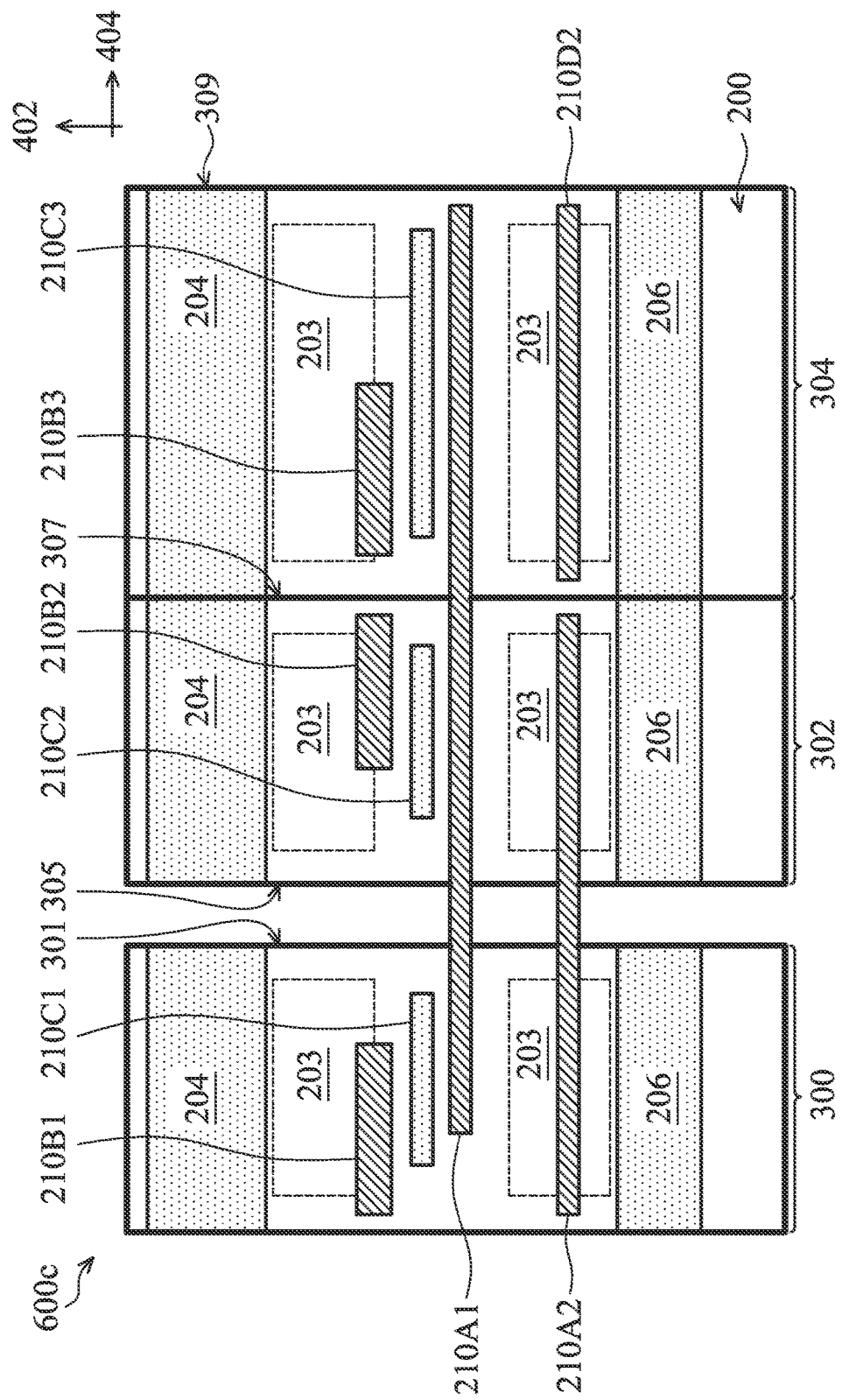

As shown in FIGS. 4 and 5D, the method 400 then proceeds to step S410 where the overlapping portions 310A1-3, 310A2-1, 310A2-2 and 310B2 as shown in FIG. 5C are removed to obtain a third physical layout 600c. In some embodiments, the first bottommost metal leads 210A1-1, 210A1-2, 210A1-3, the second bottommost metal leads 211A1-1 and 211A1-2, except for the overlapping portion 310A1-3, collectively form the first bottommost metal leads 210A1. The first bottommost metal leads 210A2-1, 210A2-2 and the second bottommost metal lead 211A2-1, excluding the overlapping portions 310A2-1 and 210A2-2, collectively form the separated first bottommost metal leads 210A2 and 210D. The first bottommost metal lead 210B2-1, excluding the overlapping portion 310B2, forms the first bottommost metal lead 210B2. Accordingly, the third physical layout 600c may comprise the first bottommost metal leads 210A1, 210A2, 210B1-210B3, 210C1-210C3 and 210D.

As shown in FIGS. 4 and 5D, the method 400 finally proceeds to step S412 where the third physical layout 600c is verified by performing a verification process. In some embodiments, the verification process may comprise a design rule check (DRC) and/or a layout-versus-schematic (LVS). In some embodiments, the verified third physical layout 600c can be converted into the corresponding bottommost metal patterns of the integrated circuit 500a-500c using tools such as CAD tools.

Embodiments provide an integrated circuit. The integrated circuit includes fin-liked electronic devices disposed in several cell regions on a substrate, extended along a first direction. In some embodiments, the channel length of the fin-liked electronic devices is designed to be 20 nm or less. Several bottommost metal patterns extended along a second direction are disposed to directly connect to the fin-liked electronic devices. In some embodiments, the integrated circuit uses bottommost metal patterns not only for the routings of the devices within a single cell region, but also for the routing between devices in different cell regions. Compared with a conventional high pin-count cell (using metal layer patterns in a layered-level higher than the bottommost metal patterns, for example, $2^{nd}$ layered-level metal (M2) layer patterns, $3^{rd}$ layered-level metal (M3) layer patterns, etc., as routings), embodiments of the integrated circuit have the advantage of the increase of the routing resource, especially for the high-pin count cell arrangement. Also, the integrated circuit can provide additional pin access areas for the fin-liked electronic devices in the bottommost metal layered-level (also referred to as first-level metal layer (M1)) of an interconnect structure. Therefore, the pin access flexibility for an integrated circuit is improved. Due to the usage of the bottommost metal patterns for the additional routing resources, the cell area density of the integrated circuit is improved.

Embodiments also provide a computer-implemented method for designing an integrated circuit. The method provides a DRC-free physical layout corresponding to bottommost metal leads for the pin accesses and routings of the electronic devices of the integrated circuit. Some of the bottommost metal leads are connected to each other by additional bottommost metal leads to overlap different cell regions of the integrated circuit. The method also provides a constraint corresponding to the bottommost metal leads. The constraint is provided to prevent the bottommost metal leads from overlapping the boundaries of the cell regions. It should be noted that the constraint is free from overlapping the additional bottommost metal leads. Compared with a conventional physical layout design for fin-liked electronic devices, embodiments of the method can achieve the goals of a faster runtime of the routings and increased routing resources.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit, comprising:
   a substrate having a first cell region and a second cell region, wherein the first cell region and the second cell region belong to two distinct cells;
   a first electronic device on the substrate in the first cell region;
   a second electronic device on the substrate in the second cell region; and
   a first bottommost metal pattern overlapping the first cell region and the second cell region, wherein the first bottommost metal pattern is coupled to the first electronic device and the second electronic device;
   wherein the first electronic device comprises:
   a first fin defined by a plurality of trench isolation features extending along a first direction; and
   a first gate structure formed on a top and opposite sidewalls of the first fin;
   wherein the first fin has first source/drain regions and a first channel region overlapped with the first gate structure and between the first source/drain regions;
   wherein the first channel region has a length along the first direction; and
   wherein the first electronic device and the second electronic device are disposed on individual dies.

2. The integrated circuit as claimed in claim 1, wherein the first bottommost metal pattern is a continuous pattern.

3. The integrated circuit as claimed in claim 1, wherein the first gate structure extends along a second direction different from the first direction.

4. The integrated circuit as claimed in claim 1, wherein the length is less than or equal to 20 nm.

5. The integrated circuit as claimed in claim 1, wherein the first electronic device is a fin field-effect transistor.

6. The integrated circuit as claimed in claim 1, further comprising:
   a third electronic device formed in the first cell region;
   a second bottommost metal pattern having two discrete segments, wherein the two discrete segments are coupled to the first electronic device and the third electronic device, respectively.

7. The integrated circuit as claimed in claim 6, wherein the segment coupled to the third electronic device is electrically connected to the second electronic device.

8. The integrated circuit as claimed in claim 1, further comprising:
   a fourth electronic device formed on the substrate in a third cell region, wherein the first bottommost metal pattern is electrically connected to the fourth electronic device.

9. The integrated circuit as claimed in claim 1, wherein the first bottommost metal pattern crosses the first cell region and the second cell region.

10. An integrated circuit, comprising:
    a substrate having a first cell region and a second cell region, wherein the first cell region and the second cell region belong to two distinct cells;
    a first fin field-effect transistor extended from the substrate in the first cell region;
    a second fin field-effect transistor extended from the substrate in the second cell region; and
    a first bottommost metal pattern overlapping a portion of a first boundary of the first cell region overlapping a second boundary of the second cell region;
    wherein the first fin field-effect transistor comprises:
    a first fin defined by a plurality of trench isolation features extending along a first direction; and
    a first gate structure formed on a top and opposite sidewalls of the first fin;
    wherein the first fin has first source/drain regions and a first channel region overlapped with the first gate structure and between the first source/drain regions;
    wherein the first channel region has a first channel length along the first direction; and
    wherein the first fin field-effect transistor and the second fin field-effect transistor are disposed on individual dies.

11. The integrated circuit as claimed in claim 10, wherein the first bottommost metal pattern is coupled to the first fin field-effect transistor and the second fin field-effect transistor.

12. The integrated circuit as claimed in claim 10, wherein the first gate structure extends along a second direction, which is different from the first direction.

13. The integrated circuit as claimed in claim 10, wherein the first channel length is less than or equal to 20 nm.

14. The integrated circuit as claimed in claim 10, further comprising:
    a third fin field-effect transistor formed in the first cell region;
    a second bottommost metal pattern having two discrete segments, wherein the two discrete segments are coupled to the first fin field-effect transistor and the third fin field-effect transistor, respectively.

15. The integrated circuit as claimed in claim 14, wherein the segment coupled to the third fin field-effect transistor is electrically connected to the second fin field-effect transistor.

16. The integrated circuit as claimed in claim 10, further comprising:
    a fourth fin field-effect transistor formed on the substrate in a third cell region, wherein the first bottommost metal pattern is electrically connected to the fourth fin field-effect transistor.

* * * * *